United States Patent [19]

Mullen

[11] Patent Number: 4,928,606
[45] Date of Patent: May 29, 1990

[54] COMBUSTION OF LOW B.T.U./HIGH MOISTURE CONTENT FUELS

[75] Inventor: Walter T. Mullen, Burlington, Canada

[73] Assignee: Air Products and Chemicals, Inc., Allentown, Pa.

[21] Appl. No.: 143,902

[22] Filed: Jan. 13, 1988

[51] Int. Cl.$^5$ .............................................. F23D 1/00
[52] U.S. Cl. .................................... 110/347; 110/188; 110/346
[58] Field of Search ............... 110/238, 347, 348, 297, 110/298, 299, 300, 188

[56] References Cited

U.S. PATENT DOCUMENTS

| | | | |
|---|---|---|---|
| 1,101,925 | 6/1914 | Harris | 122/2 |
| 2,515,545 | 7/1950 | Hugh et al. | 110/75 |
| 3,190,245 | 6/1965 | Huntington | 110/28 |
| 3,699,903 | 10/1972 | King | 110/347 X |
| 3,834,327 | 9/1974 | Hellstrom et al. | 110/18 |
| 4,235,174 | 11/1980 | Spurrell | 110/346 |
| 4,250,820 | 2/1981 | Lautenschlager | 110/347 |
| 4,362,269 | 12/1982 | Rastogi et al. | 236/14 |
| 4,377,117 | 3/1983 | Kolze et al. | 110/248 |
| 4,395,975 | 8/1983 | Ashworth et al. | 110/229 X |
| 4,493,635 | 1/1985 | Hirosato et al. | 431/90 |
| 4,515,095 | 5/1985 | Greskovich | 110/263 X |
| 4,599,955 | 7/1986 | Hepworth et al. | 110/265 X |
| 4,628,833 | 12/1986 | O'Hagan et al. | 110/263 |

Primary Examiner—Edward G. Favors
Attorney, Agent, or Firm—James C. Simmons

[57] ABSTRACT

A process for combusting low B.T.U. high moisture content fuels by enriching the normal process air used in the combustion process.

1 Claim, 3 Drawing Sheets

COMBUSTION OF LOW B.T.U./HIGH MOISTURE CONTENT FUELS

FIELD OF THE INVENTION

This invention relates to the combustion of low B.T.U., high moisture content fuels. More particularly it relates to the use of oxygen to increase the combustion rate of such fuels.

BACKGROUND OF THE INVENTION

Low B.T.U., high moisture biomass materials are commonly generated in large amounts in the pulp and paper industry. One such material is the wood waste known as hog fuel. This invention is applicable to all such biomass materials, but will be described with particular reference to hog fuel.

The use of wood waste (hog fuel) is considered a very economical method of producing steam at a pulp and paper facility, because of its low cost and ready availability. In order to minimize the use of more expensive fossil fuels. pulp mills having wood burning boilers usually attempt to burn as much hog fuel as possible.

Four presently known methods of combusting hog fuel are:
(a) grate firing;
(b) suspension firing in combination with grate firing;
(c) suspension firing;
(d) pulverized and dried suspension firing.

For purposes of illustration this invention is described as applied to one of the above, but it is not intended that it be limited to any specific firing method.

Many of the problems encountered in B.T.U., high moisture content fuels are discussed in such recently issued U.S. Pats. as the following:

| Spurrell | 4,235,174 | issued Nov. 25, 1980 |
| Lautenschlager | 4,250,820 | issued Feb. 17, 1981 |
| Rastogi, et al. | 4,362,269 | issued Dec. 7, 1982 and |
| Kolza, et al. | 4,377,117 | issued Mar. 22, 1983 | which describe the available fuels and a variety of expedients employed in an effort to overcome the problems inherent in the combustion of such materials. These expedients include predrying the fuel (Spurrell), stagewise introduction of the combustion air (Lautenschlager and Rastogi) and the provision of an improved grate (Kolza). Each of these and other proposed solutions adds to the expense of carrying out the combustion process and none of them solves all of the difficulties experienced in the process.

BRIEF SUMMARY OF THE INVENTION

Enriching the process air utilized for combusting low B.T.U. high moisture content fuels with oxygen in an amount sufficient to increase the rate of reaction of the fuel through oxygen concentration effects and to increase the temperature of combustion which in turn effects an increase in the rate at which the fuel is combusted thus permitting wood waste to be used instead of fossil fuels to produce steam in a pulp and paper facility.

DETAILED DESCRIPTION OF THE INVENTION

Figure 1:
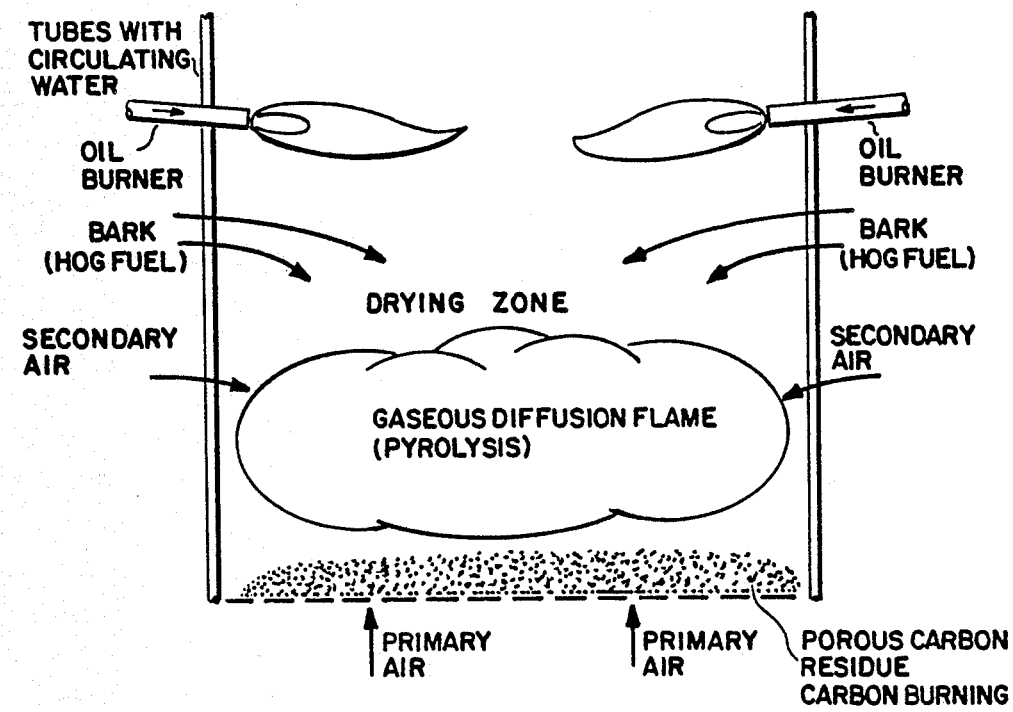
FIG. 1 is a schematic representation of an existing furnace for burning wood waste (hog fuel)

Referring to FIG. 1, it will be seen that FIG. 1 is a schematic drawing of a hog fuel boiler. The hog fuel (wood waste) is blown into the boiler approximately 15-20 feet above the floor or grate. Air is blown through the carbon residue that lands on the grate and air is also blown into the zone directly above the grate. Under steady state conditions, the wood waste will dry, pyrolyze and finally become a porous carbon residue as it falls toward the grate. The pyrolysis products and the char will react (burn) when they contact the air if the temperature in the lower furnace is high enough. The rate at which these reactions occur is a function of temperature, oxygen concentration, and other factors. The energy which is released radiates to the furnace walls which are lined with refractory or with tubes conveying water. The water is converted to steam in the upper regions of the furnace and is used in subsequent processes. Should more steam be required than that produced by the combustion of the hog fuel, auxiliary oil burners are fired to provide the additional energy requirement.

As shown in FIG. 1, hog fuel (bark, wood chips, saw dust and other wood waste) is discharged into a furnace in a region above the zone in which combustion takes place. There the water in the hog fuel is evaporated, preparatory to the combustion of the fuel. The hog fuel then descends into a zone where it is pyrolyzed. The products of pyrolysis are combusted and the char which remains after pyrolysis of the hog fuel falls on the grate and is combusted and thus completing the steps which occur in the combustion of wood waste. With 100% grate firing the wood dries and pyrolyzes on the grate and the pyrolysis products driven off are combusted above the bed of wood waste.

The present invention seeks to increase the flame temperature and to thereby increase (1) the radiant heat transfer, (2) the rate of energy absorbed by the biomass fuel fed and thus the rate of drying. () the rate of evolution (i.e. percent of total mass) of pyrolysis products (volatiles), and (4) the combustion rate. As shown schematically in FIG. 2 this is accomplished by the addition of oxygen to the prior art system shown in FIG. 1. The specific additions are (1) to the primary air utilized for the burning of the carbonaceous residue (char) present after heating. drying and pyrolysis of the fuel and after combustion of the volatiles evolved from the fuel and (2) to the secondary air, supplied to the region above the porous char residue. Also, the present invention seeks to increase the oxygen concentration in the zone of combustion and thereby increases both the rate of pyrolytic combustion and the solid carbonaceous combustion.

In order to more explicitly describe the present invention, each of the stages of the processes involved in the combustion of hog fuel will be described briefly. The nature and sources of hog fuel are described in the above noted patents. the disclosures of which are incorporated herein by this reference. In the installations shown in FIGS. 1 and 2, the hog fuel is blown into the furnace approximately 15-20 feet above the floor. The wood falls by gravity towards a perforated grate on which a bed of char forms which is normally between four (4) and twelve (12) inches thick. Primary air is introduced through the grate (primary, underfire air) and secondary air is introduced approximately four (4) feet above the bed (overfire, secondary air) e.g. as taught in Rastogi, et al. In the normal, known prior art combustion process four distinct processes appear to be involved namely:

(a) Heating and drying
(b) Pyrolysis
(c) Combustion of volatiles
(d) Combustion of char Hog fuel has a much higher moisture content than traditional fuel. ranging between forty (40) and seventy (70) percent moisture. Before any appreciable combustion takes place, this water must be driven off. This occurs shortly after the hog fuel is blown into the furnace, that is when the hog fuel reaches a temperature of between 80° and 110° C.

Pyrolysis is a degradation process in which solid material, waste wood (hog fuel) is converted into gaseous products (volatiles). It is an endothermic process which occurs between 200° and 400° C. The amount of volatiles produced is a function of how quickly the wood is heated. Increasing the heating rate will increase the yield of volatiles, reduce the production of char which is primarily carbon, and will increase the porosity of the char.

The combustion of volatiles is analogous to the flame in a fireplace. If the combustion is slow, a low temperature yellow flame is produced. When the combustion is fast, a high temperature flame is produced. Fast combustion is achieved by ensuring good mixing of the fuel with the oxygen in the combustion air. Char is the carbonaceous residue produced when wood is pyrolyzed and is similar to charcoal. Its ignition temperature is high and to sustain combustion a certain amount of energy must be reabsorbed from the surroundings.

The rate of combustion is governed by the surface to volume ratio., the diffusion rate of oxygen to the particle surface defined as the product of the mass transfer coefficient times the oxygen concentration and the temperature.

In order to improve the prior art combustion process oxygen was injected into the boiler in two different locations; into the zone where the products of pyrolysis are combusted (overfire), and into the air which contacts the char (underfire). In both cases the primary objectives were to increase the combustion rate through oxygen concentration effects and to increase the heat flux (temperature) in these areas which is a consequence of increased combustion rate. The amount of oxygen can range from 0.1 to 7% supplementary enrichment of the total volume of air being injected into the furnace. At enrichment levels below 0.1% value the effect of the oxygen does not appear to be significant while at a level above about 7% it appears that the temperature levels will approach the maximum permissible values with existing furnace constructions. The results of the temperature increase were:

(a) Heating and Drying:
Increasing the temperature in the lower boiler increased the rate at which moisture was evaporated;
(b) Pyrolysis:

Higher radiant heat transfer provided more energy for pyrolysis and increased the rate and yield of easy to burn volatiles;

(c) Combustion of Char:
The higher radiant heat transfer reduced the amount of char due to the increase in pyrolysis products yield, and produced a porous char which increased the surface to volume ratio, increased the diffusion rate of oxygen to the char surface and increased the rate of reaction as defined by the reaction rate constant.

Injecting oxygen into the underfire air accelerated the combustion rate of the char by increasing the rate of diffusion through oxygen concentration and temperature. The overall effect was to increase the amount of hog fuel which could be burned in the boiler by at least 10%.

The oxygen was introduced by lances inserted through the overfire air ports and by enrichment of the underfire air through a diffuser or through a grid system in the grate.

There are significant differences between conventional oxygen enrichment and oxygen enrichment for increasing the combustion rate of low B.T.U., high moisture fuels. In conventional enrichment, the exhaust gas volume is reduced and the flame temperature is increased. Oxygen enrichment for a combustion rate increase raises the temperature but does not materially affect the exhaust gas volume.

This is due to the fact that the difference between the two processes lies primarily in the method by which the temperature is increased. In conventional oxygen enrichment the temperature is increased primarily by decreasing the amount of nitrogen which moderates the flame temperature. With the present invention (oxygen enrichment for combustion rate increase) the increase in temperature is a function of the increased heat flux and is not primarily due to a reduction in the proportion of nitrogen present.

In the present instance, if oxygen is used to maintain flame stability a 10% increase in the average burning rate of the hog fuel may be achieved with an average enrichment level of 0.2% based on the total air requirement.

If oxygen is used to raise the combustion rate on a continuous basis a 16% increase in the burning rate can be achieved with an average enrichment level of 0.4% based on the total air requirement.

The temperature of the flame produced by a low B.T.U., high moisture o content fuel is lower than a conventional fuel flame. This limits the amount of radiation available to evaporate dissociate, dry and pyrolyze the fuel being fed to the furnace. The injection of oxygen into the zone where combustion occurs increases the flame temperature, ignites the fuel faster and draws the flame closer to the location where the fuel is evaporated, dissociated, dried and/or pyrolyzed. This effect increases the amount of energy available for evaporation, dissociation, drying and/or pyrolyzing by increasing the heat transfer rate to the low B.T.U., high moisture content fuel from radiation and/or convection since heat transfer by radiation is a function of temperature and the distance between the radiation source and the body absorbing the radiation and heat transfer by convection is a function of temperature.

The increase in available energy allows more low B.T.U, high moisture content fuel to be fired into the furnace. i.e. a new equilibrium is established between the available energy and the energy required for evaporation, dissociation, drying and pyrolysis.

The major difference between the proposed and existing methods is the manner of providing additional radiation. Oxygen enrichment increases the energy absorbed by the low B.T.U./high moisture content fuel by increasing the radiative and convective heat transfer rate by increasing the combustion rate (heat flux) of pyrolytic products, volatiles and carbon residue. An auxiliary burner may be used to provide an additional (incremental) radiation source to further increase the heat transfer rate.

Boilers designed with the combustion zone partially surrounded by walls having a high reflectance increase the radiation heat transfer to the low B.T.U. fuel by re-radiating energy from the walls., whereas oxygen enrichment increases the radiation from the combustion process.

Figure 3:
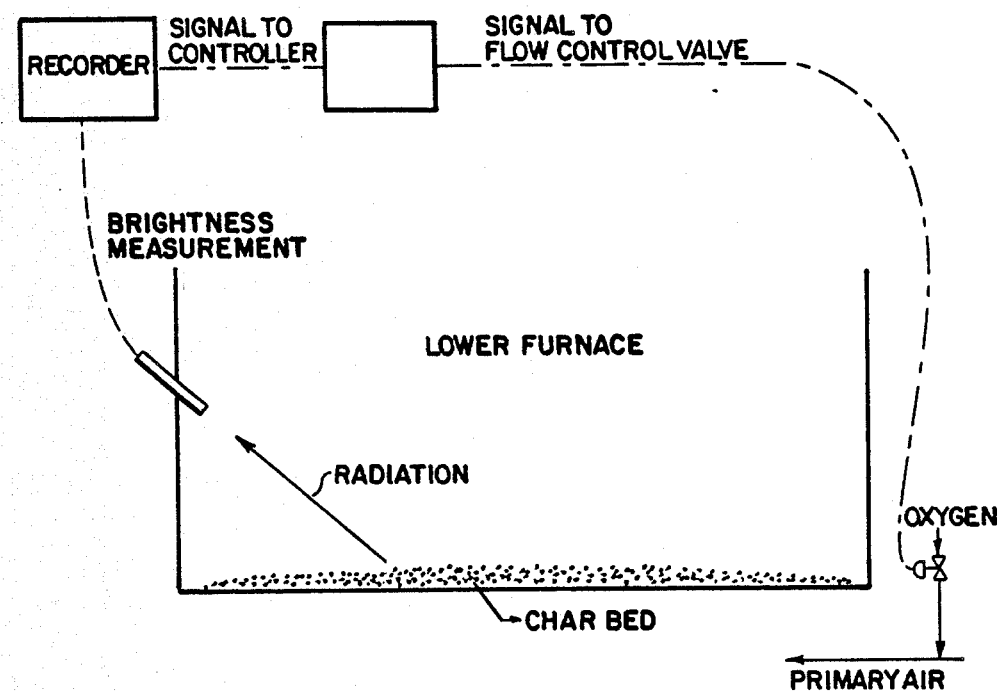
FIG. 3 is a schematic representation of one method of controlling the oxygen supplied to the primary air in the furnace of FIG. 2.
Figure 4:
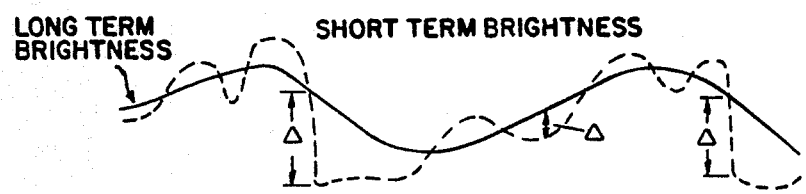
FIG. 4 is a schematic view of a recorder strip when practicing the control of FIG. 3.

In utilizing the control system shown in FIG. 3, the rate at which hog fuel is injected into the furnace is increased until the temperature (brightness) of the lower furnace starts to drop. The drop in temperature indicates that the rate of injection is greater than the rate at which the hog fuel can be combusted. Therefore, temperature is an indirect measure of the burning rate of the hog fuel.

The oxygen is injected when the rate of temperature (brightness) drop exceeds a specific value. The oxygen will increase the rate at which the hog fuel will combust and the rate of change of temperature will be less than the specified value, or be positive. This will then allow an increase in the amount of hog fuel injected into the boiler. The brightness of the char bed, which is an indirect measure of temperature, is monitored. A value based on a long term average and a value based on a short term average is generated. The difference in these two values, which is a measure of the rate of change in brightness, controls the injection rate of hog fuel.

If the difference is greater than some specific value (i.e. long term - short term > x). the amount of hog fuel injected is reduced, and this indicates the injection rate is greater than the combustion rate. Oxygen is then injected into the primary and/or secondary air if long term - short term > y where y < x. The oxygen will be turned off when long term = short term.

This ensures that the rate of injection does not exceed that rate of combustion. Therefore the oxygen is controlled based on a signal which is generated by comparing the difference between the long term and short term brightness of the char bed.

By way of example the furnace shown in FIG. 1 was operated with the following values:

| | |
|---|---|
| Long Term Value: | 30,000 Btu/ft² hr = Average radiation incident on brightness meter over 90 seconds. |
| Short Term Value: | 25,000 Btu/ft² hr = Average radiation incident on brightness meter over ten seconds. |

X = Long Term - Short Term Values = 5000 BTU/ft² hr

Set y to equal 3,000 Btu/ft² hr and the relationship between long term and short term values described above will be satisfied.

The following is a comparison of runs which did not incorporate the above mentioned control system.

| Operating Conditions Without Oxygen | |
|---|---|
| Total Steam Production | 300,000 lbs/hr |
| Steam Production From Oil | 86,000 lbs/hr |
| Oil Firing Rate | 17.2 bbls/hr |
| Steam Production From Hog Fuel | 214,000 lbs/hr |
| Hog Fuel Firing Rate | 21.4 tonnes/hr (dry) |
| Primary Air Flow | 25,000 scfm |
| Secondary Air Flow | 65,000 scfm |
| Operating Conditions With Oxygen | |
| Total Steam Production | 300,000 lbs/hr |
| Steam Production From Oil | 61,000 lbs/hr |
| Oil Firing Rate | 12.2 bbls/hr |
| Steam Production From Hog Fuel | 239,000 lbs/hr |
| Hog Fuel Firing Rate | 23.9 tonnes/hr (dry) |
| Primary Air Flow | 25,000+ scfm |
| Secondary Air Flow | 65,000+ scfm |
| Oxygen Flow | 25,000 scfh |
| Enrichment Level | |
| (a) based on Primary Only | 1.3% (max) |
| (b) based on Total Air | 0.36% (max) |

Therefore:
Reduction in Oil Consumption = 17.2 − 12.2 = 5.0 bbls/hr
Increase in Hog Fuel Consumption = 23.9 − 21.4 = 2.5 tonnes/hr (dry)

The amount of steam produced from burning hog fuel, and hence the combustion rate, is determined by measuring the total steam produced by the furnace (boiler) and subtracting the amount of steam produced by firing oil. The total steam production is determined by measuring the pressure differential across an orifice plate. The amount of steam produced by oil is determined by measuring the mass of oil sent to the oil guns and applying a factor which converts this value to an equivalent steam production rate.

The benefits of oxygen enrichment are determined by measuring the difference in steam produced from the combustion of wood with and without oxygen enrichment.

EXAMPLE:

| Total Steam Production | Oil Steam Production | | Wood Steam Production |
|---|---|---|---|
| Without Oxygen Enrichment: | | | |
| 300,000 lbs/hr | 86,363 lbs/hr | | 213,637 lbs/hr |
| With Oxygen Enrichment: | | | |
| 300,000 lbs/hr | 61,615 lbs/hr | = | 238,385 lbs/hr |
| | Difference | = | 24,748 lbs/hr |

The difference is then equated to the amount of oil (or gas) required to produce the same amount of steam.

$$\text{i.e. } 24{,}748 \frac{\text{lbs}}{\text{hr}} = 4.95 \frac{\text{bbls of oil}}{\text{hr}}$$

This value is equal to the reduction in the firing rate of oil and the increase in wood waste burning rate. The economics of the process lies in the relative difference in the cost of oil (per mmbtu) vs hog fuel (per mmbtu).

The primary obJective was to increase the amount of steam produced by burning hog fuel and subsequently reduce the consumption of expensive fossil fuels.

Conclusions Based on Measured Values (a) The average steam production from hog fuel while oxygen was injected into the boiler was 235,296 lbs/hr, based on all methods of injection.

(b) The average steam production from hog fuel without oxygen injection was 219,676 lbs/hr.

(c) Therefore, the average difference in steam production was 15,620 lbs/hr which is equivalent to 3.1 bbl/hr.

(d) The average steam production from hog fuel when oxygen was injected into the underfire air was 233,163 lbs/hr.

(e) The average steam production from hog fuel without oxygen injection during the same period was 212,980 lbs/hr.

(f) Therefore, the average difference in steam production was 20,183 lbs/hr. which is equivalent to 4.04 bbl/hr.

(g) The average steam production from hog fuel when oxygen was injected through lances was 232,483 lbs/hr.

(h) The average steam production from hog fuel without oxygen during the same period was 214,594 lb/hr.

(i) Therefore, the average difference in steam production was 17,889 lbs/hr. which is equivalent to 3.5 bbl/hr.

(j) The average steam production from hog fuel when oxygen was injected through the steam grate system was 238,995 lbs/hr.

(k) The average steam production from hog fuel without oxygen, during the same period was 230,400 lbs/hr.

(l) Therefore, the average difference in steam production was 8,595 lbs/hr. which is equivalent to 1.72 bbl/hr.

(m) The average oxygen consumption rate for the entire trial was 30,000 scfh.

Figure 2:
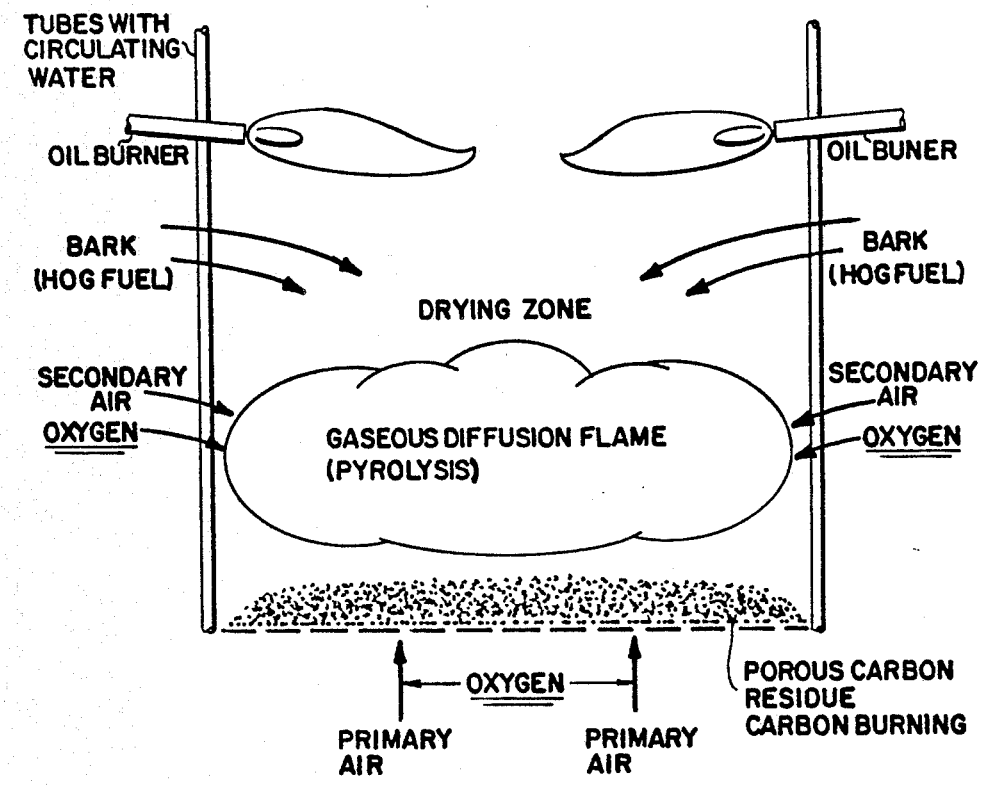
FIG. 2 is a schematic representation of the same furnace. modified in accordance with the present invention.

Similar considerations apply to the combustion of other low B.T.U, high moisture content fuels such as municipal sludge which would be injected into the furnace in the same manner as the hog fuel is blown in. Oxygen enrichment of both the primary air and secondary air as shown in FIG. 2 would produce benefits similar to those obtained when burning hog fuel.

Having now described preferred embodiments of the invention it is not intended that it be limited except as may be required by the appended claims.

1. In a method for controlling combustion in a furnace producing steam and having a bed of burning fuel said method comprising:

measuring the long term brightness of said bed of burning fuel;

measuring the short term brightness of said bed of burning fuel; and determining the difference between said long-term brightness and said short term brightness;

the improvement comprising admitting oxygen under or at the bed in the primary air and/or above the bed for stabilizing the combustion rate of the fuel or increasing the combustion rate of the fuel, and controlling the amount of oxygen admitted into said furnace based on said difference.

* * * * *